United States Patent Office 2,884,320
Patented Apr. 28, 1959

2,884,320

METHOD OF AGGLOMERATING FINE ORE

Tegner A. Johnson, Duluth, Minn., assignor to United States Steel Corporation, a corporation of New Jersey No Drawing. Application November 7, 1956
Serial No. 620,788

5 Claims. (Cl. 75—3)

This invention relates to the treatment of ore and, in particular, to the beneficiation of low-grade iron ore.

In the beneficiation of ore such as low-grade iron ore, e.g., taconite, the raw mineral is ground quite fine to facilitate a separation of iron oxide from gangue. The iron-oxide particles recovered must then be agglomerated by pelletizing, sintering or nodulizing, preparatory to use in the blast-furnace or open-hearth furnace. It is important that the agglomerated masses have sufficient strength in the green, dry, and fired states to resist disintegration in subsequent processing.

I have invented a novel method of making agglomerated masses of ore fines or like material, having increased mechanical strength in all the three states mentioned. In a preferred practice, I add to the mix of ore fines, water and other materials, if any, used in preparing agglomerated masses for pelletizing or sintering a small amount of silica solution or colloidal suspension which has been rendered substantially free of alkali-metal ions. In addition to the silica solution, I may also employ a like amount of lime or a lime-bearing compound, i.e., calcium hydroxide or carbonate. The silica solution is that obtained from an alkali-metal silicate such as water-glass, which has been treated in a known manner to remove substantially all alkali-metal ions. Such treatment involves merely bringing the solution into contact with a suitable cation-exchange medium, i.e., a synthetic resin such as a nuclear sulfonic-acid resin, Amberlite 1R–120, hydrogen form, or a carboxylic-acid resin, Amberlite 1RC–50, hydrogen form, both manufactured by Rohm and Haas Company.

The foregoing treatment must be carried out with a rather dilute solution of alkali-metal silicate, i.e., with a maximum concentration of about 3% $SiO_2$ by weight. In order to provide a more convenient form for handling this solution and addition to the charge of material to be agglomerated, it may be concentrated by evaporation up to about 30% $SiO_2$ by weight. In this case, the silica changes from a true solution to a colloidal suspension and a small amount of alkali-metal is required to stabilize the suspension to prevent formation of a viscous gel. The introduction of alkali-metal is performed most conveniently by operating the ion-exchange process in such a manner as to allow a small amount of alkali-metal ions to pass into the product at the end of each cycle. Such a concentrated silica colloidal suspension is available commercially from E. I. du Pont de Nemours and Company under the trade name of "Ludox."

In a typical example of the practice of the invention, I add to iron-ore fines an amount of silica solution substantially free from alkali-metal ions, sufficient to provide from 2 to 10 lbs. of $SiO_2$ per long ton of fines. The concentration of the solution should be as high as readily obtainable, without forming a gel, and the amount of water added to make a suitable mix will depend on the concentration and amount of solution used. A typical formula is:

| | Percent |
|---|---|
| $SiO_2$ (in solution as colloidal suspension as previously described) | 0.25 |
| Total water (including that of silica solution) | 10.00 |
| Ore fines or concentrate | 89.75 |
| | 100.00 |

A mix of this formulation, after passing through a pug mill, may be subjected to balling by any suitable means and subsequently heat-hardened by passing through a shaft or grate-type furnace. Alternatively, the mix may be fed directly to the traveling grate of a conventional sintering machine.

In addition to the silica solution, I may also include in the mix from one to three times as much lime or a lime-bearing compound such as calcium hydroxide or calcium carbonate, as the $SiO_2$ contained in the silica solution. Pellets may be formed in the usual manner from this mix and then dried and fired according to customary practice.

The improved strength imparted to pellets made according to the invention in the green, dry, and fired states is shown in Table I giving the results of compression and tumble tests:

TABLE I

*Effect of additives on strength of pellets*

| Test | Additive per Long Ton of Mix | Compressive Strength of Balls—Lbs. | | | |
|---|---|---|---|---|---|
| | | Green | Dry | 1,150° C. | 1,200° C. |
| 13 | None | 3.0 | 2.0 | | 1,120 |
| 12 | 3 lbs. $SiO_2$ | 6.0 | 5.5 | | 1,700 |
| 14 | 6 lbs. $SiO_2$+6 lbs. $Ca(OH)_2$ | 6.0 | 4.0 | 1,705 | |
| 15 | 6 lbs. $SiO_2$+6 lbs. $CaCO_3$ | 5.5 | 3.5 | 1,570 | |

| Test | Tumble test results [1] | | | |
|---|---|---|---|---|
| | Strength Index (Percent) [2] | Cumulative Weight Percent Retained | | |
| | | +0.525" | +3 Mesh | +10 Mesh |
| 13 | 18.85 | 73.7 | 93.9 | 94.5 |
| 12 | 54.71 | 97.0 | 97.0 | 97.0 |
| 14 | 23.60 | 89.8 | 89.8 | 91.3 |
| 15 | 55.11 | 94.0 | 97.0 | 97.0 |

[1] Standard tumble test (1000–2000 g. of −1" +¾" material tumbled for 200 rev.). "Testing of Iron Ores and Agglomerates Related to Blast Furnace Use," Proceedings Blast Furnace, Coke Oven and Raw Materials Committee, AIME (1951), vol. 10, pp. 122–152.

[2] Strength Index (Percent) =
$$\frac{(\text{Aver particle size after tumbling})^3}{(\text{Aver. particle size before tumbling})^3} \times 100$$
or
$$\frac{(\text{Aver. particle volume after tumbling})}{(\text{Aver. particle volume before tumbling})} \times 100$$

Instead of being pelletized and furnace-hardened, the mix may be laid on the grate of a conventional sintering machine, after the addition of a suitable amount, say 4% by weight of the total dry mix, of a carbonaceous combustible such as anthracite fines or coke breeze. The results of tests on the product resulting are given in Table II.

TABLE II

*Effect of additives on strength of sinter*

| Test | Additive per Long Ton of Mix | Strength Index (Percent) | Tumble Test Results Cumulative Weight Percent Retained | | |
|---|---|---|---|---|---|
| | | | +0.525" | +3 Mesh | +10 Mesh |
| 244 | None | 3.2 | 36.2 | 74.9 | 86.7 |
| 245 | None | 3.5 | 37.4 | 75.4 | 87.7 |
| 255 | 5.6 lbs. SiO₂ | 6.4 | 54.1 | 80.9 | 90.0 |
| 254 | 5.6 lbs. SiO₂+16.8 lbs. Ca(OH)₂ | 4.0 | 42.0 | 75.1 | 88.9 |

The data in Tables I and II show that the silica solution with or without hydrated lime (Ca(OH)₂) or limestone (CaCO₃) imparts improved strength in the green, dried, or fired agglomerates. Strength with the additives exceeded the strength without the additives in every case. The agglomerates for which data are given in the tables were made from finely ground magnetite concentrate, such as is obtained from magnetite taconite of the Mesabi range of Minnesota.

The reason why a silica solution free from alkali-metal ions develops increased strength in pellets, or agglomerates in general, is not clearly understood. Two possible mechanisms can be postulated, viz., ion-exchange and the instability of the solution.

On passing a solution of sodium silicate through a cation-exchange resin in the hydrogen form, the sodium ions in the sodium silicate exchange positions with hydrogen ions in the resin. Therefore we no longer have a solution of sodium silicate but a solution similar to silicic acid with the exception of the solubility of the silica. Silicic acid (H₂SiO₃) has a solubility so low that it is negligible, whereas a silica solution obtained by passing a solution of sodium silicate through the exchange resin increases the solubility of silica to approximately 3 grams per 100 milliliters or a 3% solution.

In the agglomeration processes, one of the factors contributing to the development of binding qualities and subsequent compressive strength in the formation of calcium and/or iron silicates at high temperatures. In using the silica solution free of sodium ions as a sole additive in the agglomeration processes, the ferrous ions from the ore may replace the hydrogen ions in the silicic acid and combine with the silica ions forming an iron silicate, which acts as a binder. When using lime or limestone as a second additive, the calcium ions present can replace the hydrogen ions in the silicic acid and combine with the silica ions, forming calcium silicate which also acts as a binder.

From the degree of solubility mentioned above, the silica solution should be unstable and this is shown by the fact that, on standing for a length of time, a stable gel forms. This instability of solution probably causes the development of binding qualities in the agglomerates by the precipitation of calcium and iron silcates.

Although I have disclosed herein the preferred practice of my invention, I intend to cover as well any change or modification therein which may be made without departing from the spirit and scope of the invention.

I claim:

1. In a method of treating ore fines, the steps comprising removing alkali-metal cations from an alkali-metal silicate solution, mixing with said fines the resulting silica solution substantially free from alkali-metal cations, in an amount sufficient to furnish from 2 to 10 pounds of SiO₂ per long ton of ore fines and then subjecting the mixture to heat, thereby forming masses of ore suitable for smelting.

2. A method as defined by claim 1, characterized by adding to said mixture a lime-bearing compound selected from the group consisting of the oxide, the hydroxide, and the carbonate of calcium, in an amount of from 2 to 20 pounds per long ton of fines.

3. A method as defined by claim 1, characterized by forming the mixture into masses before heating.

4. A method as defined by claim 1, characterized by said heating being effected by passing the mixture through a furnace.

5. A method as defined by claim 1, characterized by said heating being effected by placing the mixture on the grate of a sintering machine.

References Cited in the file of this patent

UNITED STATES PATENTS

| 982,796 | Collins | Jan. 31, 1911 |
| 1,111,919 | Paterson | Sept. 29, 1914 |
| 1,739,839 | Jung | Dec. 17, 1929 |
| 2,380,945 | Collins | Aug. 7, 1945 |

UNITED STATES PATENT OFFICE
CERTIFICATE OF CORRECTION

Patent No. 2,884,320                                                April 28, 1959

Tegner A. Johnson

It is hereby certified that error appears in the printed specification of the above numbered patent requiring correction and that the said Letters Patent should read as corrected below.

Column 3, line 44, for "strength in the formation" read -- strength is the formation --.

Signed and sealed this 18th day of August 1959.

(SEAL)
Attest:

KARL H. AXLINE
Attesting Officer

ROBERT C. WATSON
Commissioner of Patents